(12) United States Patent
Reichert et al.

(10) Patent No.: US 7,697,120 B2
(45) Date of Patent: Apr. 13, 2010

(54) SCANNING APPARATUS

(75) Inventors: Rainer Reichert, Horn (AT); Andreas Ullrich, Gablitz (AT); Martin Pfennigbauer, Tulln (AT); Johannes Riegl, Infritz (AT)

(73) Assignee: Riegl Laser Measurement Systems GmbH, Horn (AT)

( * ) Notice: Subject to any disclaimer, the term of this patent is extended or adjusted under 35 U.S.C. 154(b) by 623 days.

(21) Appl. No.: 11/604,282

(22) Filed: Nov. 27, 2006

(65) Prior Publication Data

US 2008/0123170 A1 May 29, 2008

(51) Int. Cl.
*G01C 3/08* (2006.01)
(52) U.S. Cl. ............... 356/5.02; 356/3.01; 356/3.15; 356/4.01; 356/5.01; 356/5.1
(58) Field of Classification Search ........ 356/3.01–28.5
See application file for complete search history.

(56) References Cited

U.S. PATENT DOCUMENTS

| | | | |
|---|---|---|---|
| 3,892,466 A | 7/1975 | Kendy et al. | |
| 4,024,392 A | 5/1977 | Teppo et al. | |
| 4,024,393 A | 5/1977 | Braun et al. | |
| 4,025,193 A | 5/1977 | Pond et al. | |
| 4,039,246 A | 8/1977 | Voigt | |
| 4,700,301 A | 10/1987 | Dyke | |
| 5,648,852 A | 7/1997 | Kato et al. | |
| 6,153,878 A | 11/2000 | Jakob et al. | |
| 2002/0060784 A1* | 5/2002 | Pack et al. ............ 356/6 |
| 2002/0186361 A1* | 12/2002 | Ueno et al. ............ 356/4.01 |
| 2006/0114450 A1* | 6/2006 | Nimmakayala et al. 356/139.04 |
| 2007/0008514 A1* | 1/2007 | Krasutsky ............ 356/4.01 |

FOREIGN PATENT DOCUMENTS

AT    383 688 B    11/1984

OTHER PUBLICATIONS

UK Search Report Application No. GB0720639.4 dated Jan. 4, 2008.

* cited by examiner

*Primary Examiner*—Thomas H Tarcza
*Assistant Examiner*—Luke D Ratcliffe
(74) *Attorney, Agent, or Firm*—Buchanan Ingersoll & Rooney PC

(57) ABSTRACT

A scanning apparatus for use in a scanning optical system comprises a laser transmitter to produce a transmitter beam. This transmitter beam is deviated by a beam scanner, e.g. a tiltable mirror, to produce a pattern of a scanning beam. There are bearings which define first and second axes of rotation perpendicular to each other and intersecting each other in an intersecting point for allowing the beam scanner to scan. In front of the beam scanner is a window of transparent material in the shape of a spherical cap so as to define a central axis and a central point. The central axis intersects the intersecting point of the two other axes, and this common intersecting point coincides preferably with the central point of the sphere of the window.

27 Claims, 3 Drawing Sheets

SCANNING APPARATUS

FIELD OF THE INVENTION

The present invention relates to a scanning apparatus comprising beam scanning means for directing incident rays of radiation from a laser source to produce a pattern of a scanning beam. To enable a wide field of view, a window in the shape of a spherical cap is provided.

BACKGROUND OF THE INVENTION

Laser scanners have been conceived for a vast field of applications, such as laser range finders, tracking systems, 3-D image producers and so on. As mentioned above, an exit (and also entry) window in the shape of a spherical cap have been used to enable a wide field of view. This is especially of importance in the case of tracking systems as described in U.S. Pat. Nos. 4,039,246 and 4,024,392. Certainly, in the case of tracking systems, it is only of importance to know whether the object sought is in the field of view or not. Therefore, optical deviation or distortions are hardly important. This will well be understood, if considering that both U.S. Patents provided mirrors as the beam scannings, which in the first case was inclined to the axis of the spherical cap of the window (i.e. the symmetry axis which goes through the center of the cap) and, while rotating, gave a certain loop pattern in the object space, while the second one had a mirror which rolled over the curvature of bow of a gimbal, thus deviating the scanning beam very much.

Although a spherical window in the above sense has the advantage of providing a wide field of view, it has the disadvantage that the curved window acts, in some way, like a lens which, in cooperation with the beam scanner (mostly a mirror) might, however, introduce some optical distortions into the 2-D image gathered by mere scanning in a "horizontal" and "vertical" direction ("horizontal" and "vertical" understood in the sense of video-scanning in X- and Y-direction), while measuring the distance to the object provides data in the third spatial axis, i.e. the Z-direction. This, in some applications, is of course undesirable.

SUMMARY OF THE INVENTION

It is an object of the invention to improve the quality of data provided by scanners of the type described above.

This object is achieved by a combination of measures, i.e. by tilting or rotating the beam scanner about first bearing means for rotatably supporting said beam scanner about a first axis of rotation and by second bearing means for rotatably supporting said beam scanner about a second axis of rotation perpendicular to said the direction of said first rotation so as to define an intersecting point of said axes of rotation or at least an almost intersecting point, as it should be understood in the context of the present specification, because a small deviation, although not being the ideal, would not do much harm. In this way, the intersecting point is well defined. This well defined intersecting point is then thoroughly put onto the central axis of the window so that deviations and distortions are minimized. The beam scanner can assume various forms and shapes, e.g. the form of a prism, but is preferably a tilting mirror.

A further improvement can be achieved by providing a correcting arrangement within the path of rays either in the direction towards the beam scanner or away from it. Since the spherical window acts as a kind of negative lens, such correction can be done in various ways. One possibility is simply to compensate the axial shift of the focus, provoked by the lens effect of the spherical cap window, by a corresponding shift of at least one, the transmitter and/or of the receiver. Another possibility consists in inserting a lens (or several lenses) in the path of rays, preferably in that portion of the path which is not facing the window, but on the opposite side with respect to the beam scanner. A further possibility, either realized as a variant or in addition, is to give the beam scanner a corresponding curvature. In the case of a mirror, this mirror may have a concave curvature. A fourth possibility is to have an optical arrangement at the side of the window, e.g. outside the window, and to correct its elements (at least one lens and/or mirror and/or prism) appropriately. The term "correction", in this context should mean any arrangement which is able to take the effect of the spherical window into account. A particularly preferred possibility consists in that at least one of the transmitter and/or receiver optics is designed so as to correct the effect of the curved window, while supplying an uncorrected image in case the window were removed, so as to take the spherical curvature of said window means into account Although the object of the invention will be obtained if only the transmitter beam performs a scanning motion, it is preferred if the apparatus contains also a receiver to receive the rays reflected from an outside object. In this case, it is suitable, if the reflected rays are received via the center range of the scanning mirror (which range may vary in size) so that the beam of the transmitter and the incoming rays are coaxial, at least in the path from the mirror and through the spherical cap window. This is further measure to improve the quality of the measurement.

BRIEF DESCRIPTION OF THE DRAWINGS

Further details and characteristics of the invention will become apparent from the following description of embodiments with reference to the attached schematic drawings, in which.

DETAILED DESCRIPTION OF THE DRAWINGS

Figure 1:
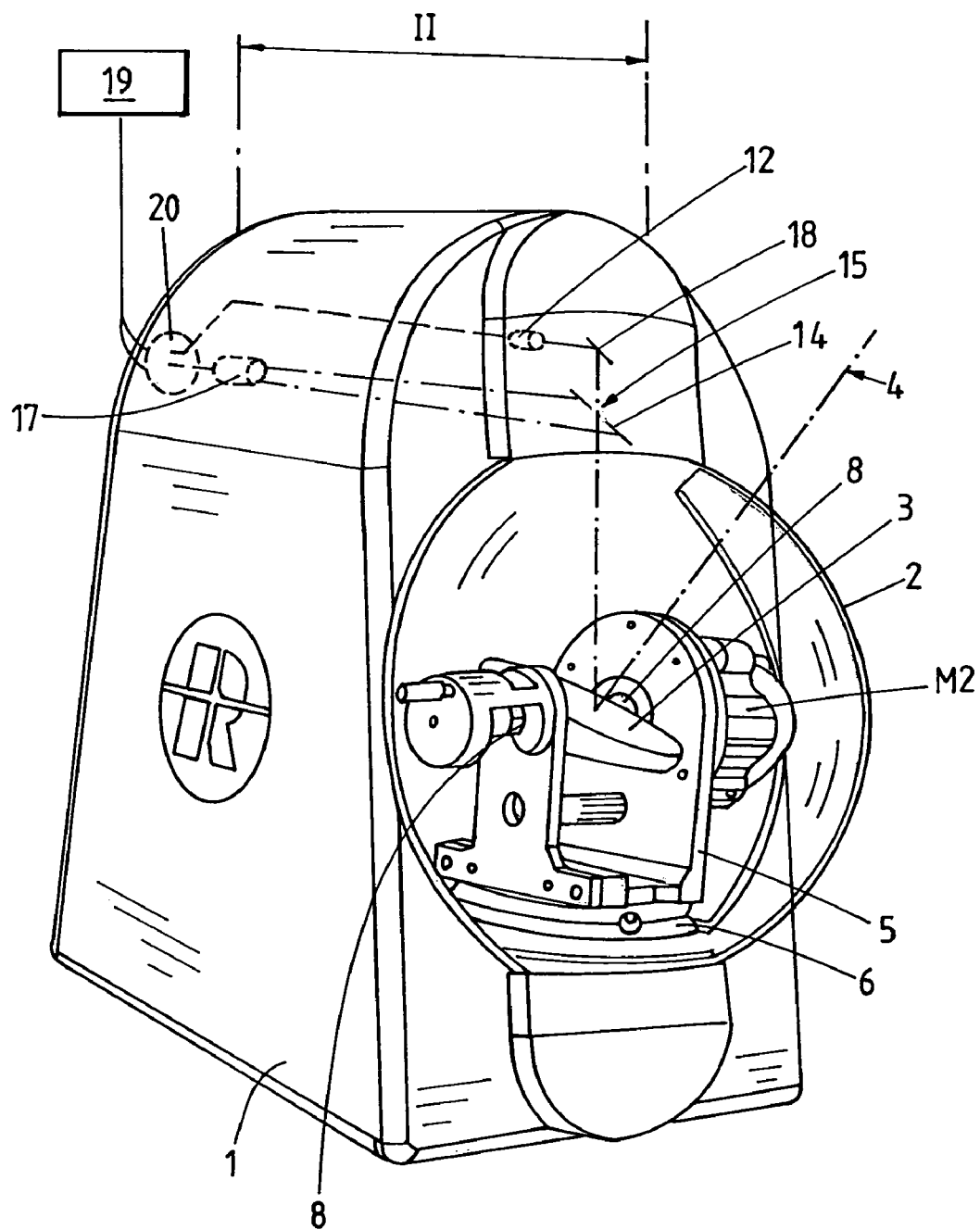
FIG. 1 is a perspective view of a laser scanner according to the invention.

According to FIG. 1, a housing 1 has a spherical, cap-shaped window 2, behind which a tiltable mirror 3 is supported. This mirror 3 serves as a beam scanner which directs a radiation beam 4 through the window 3. This window 3 may be of glass, polymethacrylate (PMMA or PLEXIGLAS), optionally coated with a scratch resistant layer, where it is preferred in both cases that the window surface is coated with a anti-reflex coating and/or an anti-rain coating (to avoid dirtying of the surface). The thickness of the window material th (in FIG. 2) should be as thin as possible to avoid that it exerts an optical influence as a lens. Therefore, the thickness should preferably be not more than 4 mm, but could assume a value in the range of 1 to 2.5 mm for practical purposes depending on the mechanical strength requirements. For it should be considered that it has sufficient strength not to bend involuntarily or to break. Instead of the tiltable mirror 3, other known beam scanning devices may be used, such as rotating prisms, rotating mirrors and so on.

Figure 2:
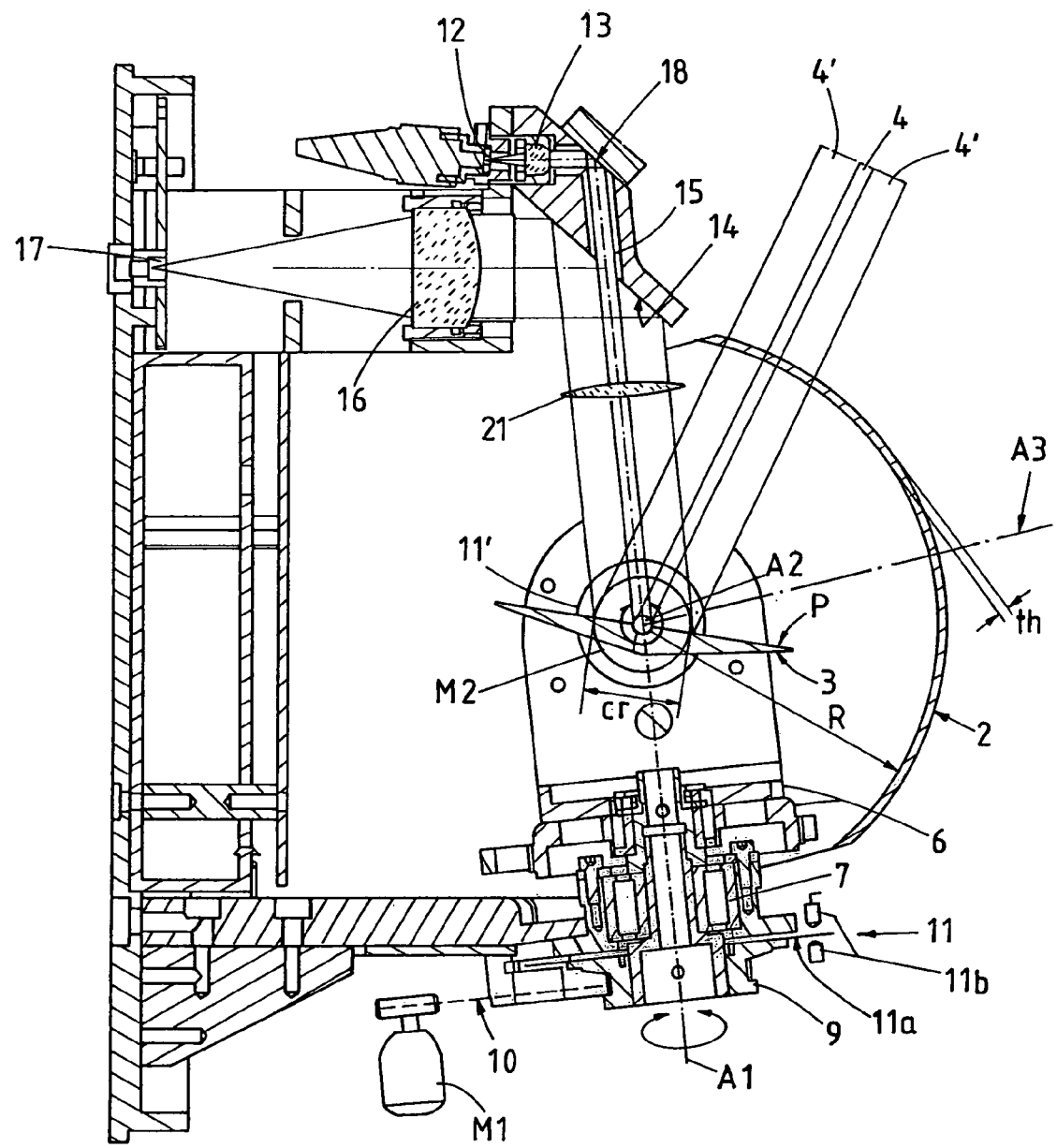
FIG. 2 is a cross-sectional view along the plane II of FIG. 1.

To render the mirror 3 tiltable about two axes, a generally U-shaped bearing chair 5 is mounted on a turntable 6 supported in a first bearing 7 (FIG. 2), which defines a substantially vertical axis A1 (FIG. 2), while the two legs of the U-shaped bearing chair 5 support bearings 8 which define a substantially horizontal axis A2 perpendicular to the vertical axis A1. FIG. 2 shows clearly that both axes A1, A2 intersect each other at least nearly in a manner that any deviation from an exact intersection remains still acceptable for the respective purpose. It is to be understood that the terms "horizontal" and "vertical" in the context of this specification are relative and refer to the illustration in the drawings, because it is clear that the apparatus according to the invention can be turned, e.g. when flying in an air plane.

To minimize optical distortions or deviations, one has to consider that the transparent window 2 acts as a lens which could cause such deviations or distortions within the optical path to be still described. According to the invention, the center axis of this "lens" 2, i.e. axis A3, coincides with the point of intersection of the two other axes A1 and A2. Furthermore, it may be advantageous, if the point of intersection of the three axes A1, A2, A3 is at least approximately in the center point of the sphere of window 2. In this way, the beam 4 (FIG. 1) may be swept or scanned over the whole width of the window 2 without introducing undesirable variations of possible residual optical faults. Furthermore, it is suitable if the point of intersection of the axes A1, A2 is at least approximately in the center point of the spherical window 2 and coincides with it.

It is clear that such precise coincidence of the point of intersection of the axes A1, A2 and the axis A3, as well preferably also with the center point of the spherical window may be attained by careful manufacture. However, it may be convenient to provide at least one adjusting arrangement to obtain such coincidence, if there are too many tolerances in production.

A further advantageous possibility of minimizing deviations and distortions is to provide that one of the two axes A1, A2, according to FIG. 2, is in the mirror plane P of the mirror 3. In principle, it could be either the Axis A1 or the axis A2, but is preferably the horizontal axis A2. Although slight deviations from the plane P are not too detrimental, it is preferred, if the axis A2 is at least substantially in the plane P so as not to cause a "rolling movement" of the scanned image or image point.

In order to tilt the mirror 3 about the axis A1, there is a first motor M1 (FIG. 2) to drive the turntable 6. This motor M1 is suitably a stepping motor so that accuracy of the turntable motion is maintained. Moreover, the motor M1 may drive a wheel or pinion 9 by means other than mere friction, i.e. either by a chain or, as preferred, by a tooth belt 10. Rotation of the turntable 6 is conveniently monitored by having an angle encoder 11 of known construction, such as an angle coding disk 11*a* and an optical reader 11*b*. It will be clear that any angle encoder construction may be used, such as other optical, inductive, capacitive ones or other forms of such encoders.

Since the mirror 3 has to be tilted over a limited angle only about the horizontal axis A2, it is suitable if it is driven in about this axis by a Limited Angle Torque Motor (LAT) M2 (FIGS. 1, 2), although other types of motors could also be used. In any case, the movement of the mirror 3 about the two axes A1, A2 allows scanning of a field of view through the transparent window 2. Thus, provided the housing 1 (FIG. 1) contains a transmitter 12, which is preferably a laser transmitter, laser light may be sent through a transmitter optical system 13 (FIG. 2) to be directed onto the mirror 3 which scans the laser beam over the entire height and width of the window 2. A similar angle encoder as the angle encoder 11, may be used for the rotation about the axis A2 too, although it would even be possible to have a different one. In FIG. 2 an angle encoder 11' is merely schematically indicated as an angle coding disk.

Using the above scanning apparatus for a laser range finder and/or a laser scanner, the laser beam 4 may be sent towards an object outside the window 2 and may be reflected by it, as is known per se. The reflected rays 4' will enter the window 2, reach the mirror 3 to impinge in a center range cr and will be reflected to a reflector 14 which separates the outgoing transmitter beam 4 from the ingoing reflected rays 4'. The dimensions of the center range, in practice, vary relative widely as a function of the mirror position, so that the mirror 3 will suitably be elliptical rather than circular.

The separation of the outgoing and ingoing rays can be done in various ways, for example by using a partially reflective reflector 14. However, since this causes an attenuation, either of the outgoing signal or of the ingoing signal, it is preferred, if the reflector 14 has a central hole 15 which allows passage of the thin transmitter beam 4 from the laser source 12, through the optical system 13 to a deviating mirror 18 and through the hole 15, while the reflector 14 reflects the relative broader stream of reflected rays 4' through a receiver optics 16 to a receiver 17. As is indicated in FIG. 1, the signals of the transmitter 12 and the receiver 17 are conveyed via sockets 20 (only schematically represented) to an appropriate circuitry 19, which will be described in detail with reference to FIG. 3.

It has been mentioned above that the window 2, due to its spherical cap-shape, acts as a lens. Although the effect may be small due to the measures taken according to the invention, it may be suitable to eliminate even the rest of it. Practically, it is the question of a compensation or correction, whatever it may be called.

This correction or compensation may be made either to act in common for both the outgoing beam 4 and the ingoing beam 4' or separately. In the first case, the one simple possibility is to insert a correcting lens 21 (FIG. 2) in the path of rays. Alternatively, the mirror surface of mirror 3 may be made slightly concave for compensation. A third way of correcting the effect of the lens-like window 2 is to insert correction elements into both optical systems 13 and 16 (or at least into one of them). Another simple compensation consists in that the diffractive action of the window 2 is already considered when computing the curvatures and diffractions of the elements of the optical systems 13 and/or 16. Practically, the window 2 acts as a concave lens which prolongs the focal length. This can by compensated, e.g. by using lenses in the optics 13, 16 of higher diffraction values. However, considering that the shift of the focal length is quite small, e.g. 2 mm, one could simply shift and arrange the optics 13, 16 or the receiver diode 17 or the transmitter 12 by a corresponding distance.

Figure 3:
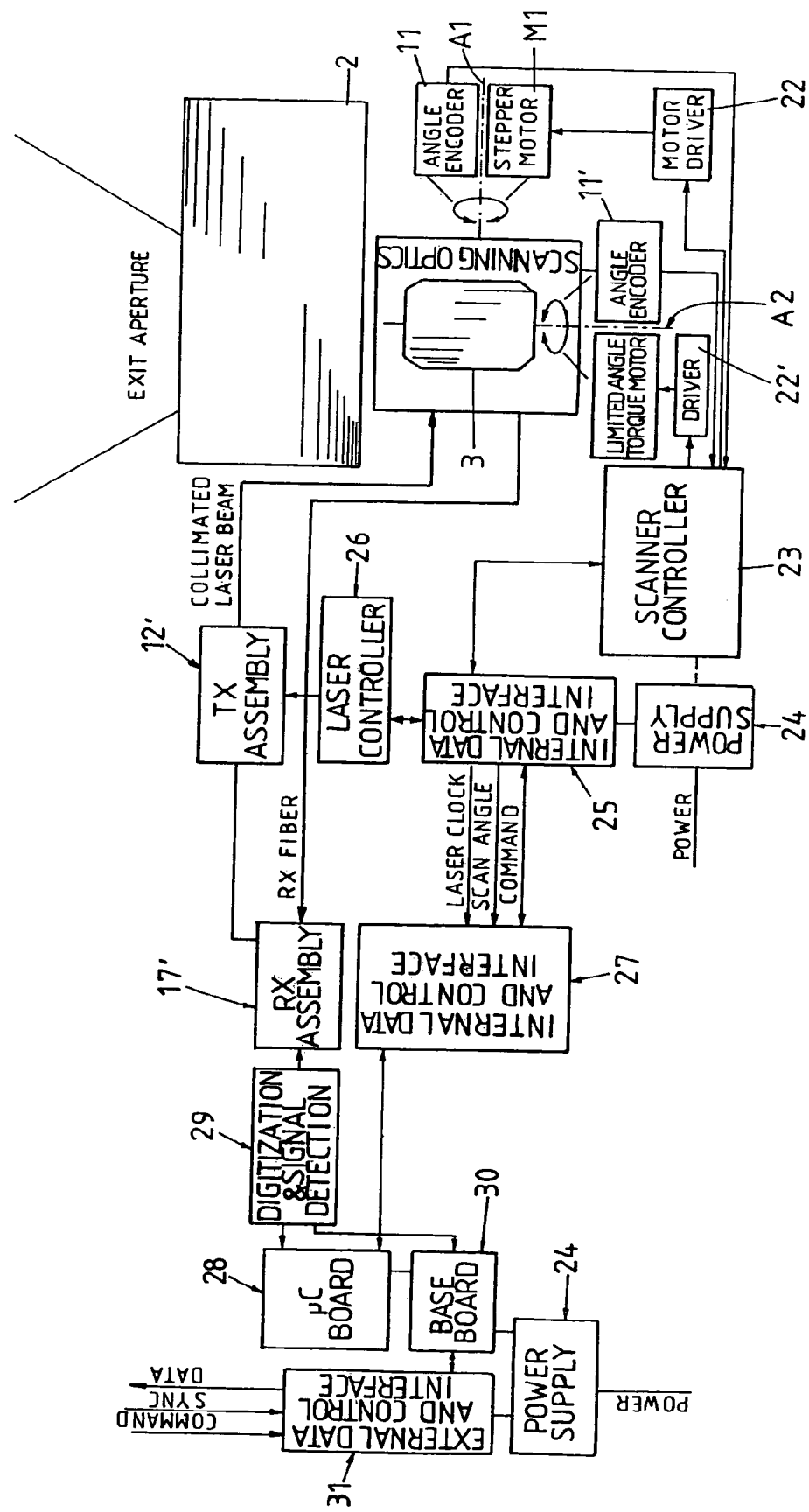
FIG. 3 is a schematic block-diagram of the associated electronics.

FIG. 3, at right, shows substantially those optical parts described above and relates to a particularly preferred realization, although it may be modified in various ways, as is known in the art. It may be seen that a driver stage 22, 22' is assigned each to one of the motors M1 and M2. These driver stages 22, 22' are controlled by a scanner controller 23 so as to provide synchronous motion of the mirror 3. On the other hand, to obtain such synchronous motion, the output signals of both angle encoders 11 and 11' are fed to the scanner controller 23 which is powered by a power supply 24. An output signal of the scanner controller 23 is fed to a first interface 25 which, in turn, is in communication with a laser controller 26 to control a transmitter assembly 12' that includes the laser transmitter 12 (FIGS. 1, 2). It should be noted, however, that the transmitter laser 12 may optionally send its beam at any time, while the mirror 3 is in any position.

This communication with the laser controller 26 together with the connection to the scanner controller 23 enables the first interface 25 to send information signals on laser clock (to know when a count-down for determining the time-of-flight of a laser beam has begun), on the scan angle and for command to a second interface 27 which, in turn, delivers the necessary signal information to a micro-processor 28 to evaluate the range and, optionally, other information. To this end, the micro-processor 28, after digitization in a corresponding stage 29, receives the receiver signals from a receiver assembly 17' which includes the receiver 17 (FIGS. 1, 2). Since the, thus determined, time-of-flight gives the information of a field of view in the direction of the transmitter beam 4 (FIG. 2), while the angle decoders 11, 11', through the second interface 27 gives a 2-dimensional information to which that in the direction of beam 4 is the third one, the micro-processor 28 has all data necessary to form a 3D-image and may do this and send it via a base board 30 to a third interface 31, e.g. to bring this information onto the screen of a monitor over the three output lines (or more) as shown in FIG. 3. An appropriate software similar to a CAD software which is able to produce a 3-dimensional image and is known per se, in the micro-processor 28 or in a separate stage may be used either directly or in an adopted version to be able to turn the 3D-image on the screen around at will.

What is claimed is:

1. Scanning apparatus for use in a scanning optical system comprising:
    a source of laser radiation;
    beam scanning means for directing incident rays of radiation from said laser source to produce a pattern of a scanning beam,
    first bearing means for rotatably supporting said beam scanning means about a first axis of rotation;
    second bearing means for rotatably supporting said beam scanning means about a second axis of rotation perpendicular to said first axis of rotation so as to define an intersecting point of said axes of rotation;
    window means of a transparent material in the shape of a spherical cap so as to define a central axis through the window means, said central axis intersecting said intersecting point; and
    a correcting arrangement within the path of rays of said beam scanning means for correcting the focal shift that results from said spherical cap window means.

2. Apparatus as claimed in claim 1, wherein said correcting arrangement comprises a positive lens in the path of rays from said radiation source to said beam scanning means.

3. Apparatus as claimed in claim 1, wherein at least one of the transmitter and/or receiver optics is designed so as to correct the effect of the curved window, while supplying an uncorrected image in case the window were removed.

4. Apparatus as claimed in claim 1, wherein said transparent material has a thickness of 4 mm in maximum.

5. Apparatus as claimed in claim 4, wherein said transparent material has a thickness in a range of 1 to 2.5 mm.

6. Scanning apparatus for use in a scanning optical system comprising:
    a source of laser radiation;
    tiltable mirror means for directing incident rays of radiation from said laser source to produce a pattern of a scanning beam,
    first bearing means for rotatably supporting said mirror means about a first axis of rotation;
    second bearing means for rotatably supporting said mirror means about a second axis of rotation perpendicular to said first axis of rotation so as to define an intersecting point of said axes of rotation;
    window means in the shape of a spherical cap having a center point of its sphere so as to define a central axis through the window means, said central axis intersecting said intersecting point; and
    a correcting arrangement within the path of rays of said tiltable mirror means for correcting the focal shift that results from said spherical cap window means.

7. Apparatus as claimed in claim 6, wherein said correcting arrangement comprises a concave curvature of said mirror means.

8. Apparatus as claimed in claim 6, wherein said laser source is arranged to direct said rays of laser radiation to the center of said mirror which is tiltable about said first and second axes of rotation.

9. Apparatus as claimed in claim 6, further comprising first and second motor means for rotating said mirror about said first and second axes of rotation, at least one of said first and second motor means being a limited angle torque motor.

10. Scanning apparatus for use in a scanning optical system comprising:
    a source of laser radiation;
    tiltable mirror means for directing incident rays of radiation from said laser source to produce a pattern of a scanning beam,
    first bearing means for rotatably supporting said mirror means about a first axis of rotation;
    second bearing means for rotatably supporting said mirror means about a second axis of rotation perpendicular to said first axis of rotation so as to define an intersecting point of said axes of rotation;
    window means in the shape of a spherical cap having a center point of its sphere so as to define a central axis through the window means, said central axis intersecting said intersecting point, wherein said center point and said intersecting point coincide and
    a correcting arrangement within the path of rays of said tiltable mirror means for correcting the focal shift that results from said spherical cap window means.

11. Scanning apparatus for use in a scanning optical system comprising:
    a source of laser radiation for sending laser rays along an axis;
    tiltable mirror means for directing incident rays of radiation from said laser source to produce a pattern of a scanning beam, said mirror means having a center range;
    first bearing means for rotatably supporting said mirror means about a first axis of rotation;
    second bearing means for rotatably supporting said mirror means about a second axis of rotation perpendicular to said first axis of rotation so as to define an intersecting point of said axes of rotation;
    window means in the shape of a spherical cap so as to define a central axis through the window means, said central axis intersecting said intersecting point; and
    receiver means for receiving rays sent by said source of laser radiation and reflected from an object outside said window means, said receiver means being arranged so as to receive said reflected rays via the center range of said mirror means; and
    a correcting arrangement within the oath of rays of said tiltable mirror means for correcting the focal shift that results from said spherical cap window means.

12. Apparatus as claimed in claim 11, wherein said laser source is arranged to direct said rays of laser radiation to the center range of said mirror which is tiltable about said first and second axes of rotation, so that the said rays of radiation and said reflected rays are substantially coaxial.

13. Apparatus as claimed in claim 11, further comprising reflecting means within the path between said mirror means and said source of laser radiation, said reflecting means comprising a central hole for allowing passage of one of said rays.

14. Apparatus as claimed in claim 11, wherein said second bearing means comprise a turntable onto which said first bearing means and said mirror means are mounted.

15. Apparatus as claimed in claim 14, further comprising a stepping motor for driving said turntable.

16. Apparatus as claimed in claim 11, wherein said receiver means comprise a single photosensitive element.

17. Scanning apparatus for use in a scanning optical system comprising:
- a source of laser radiation for sending pulses of laser rays along an axis;
- beam scanning means for directing incident rays of radiation from said laser source to produce a pattern of a scanning beam, said beam scanning means having a center range;
- first bearing means for rotatably supporting said beam scanning means about a first axis of rotation;
- second bearing means for rotatably supporting said beam scanning means about a second axis of rotation perpendicular to said first axis of rotation so as to define an intersecting point of said axes of rotation;
- window means in the shape of a spherical cap so as to define a central axis through the window means, said central axis intersecting said intersecting point;
- receiver means for receiving rays sent by said source of laser radiation and reflected from an object outside said window means, said receiver means being arranged so as to receive said reflected rays via the center range of said mirror means to provide an output signal;
- evaluating means coupled both to said source of laser radiation to receive at least one of said pulses and to said receiver means to receive said output signal, said evaluating means being adapted to calculate a distance to an object outside said window means by the time-of-flight between the time of said pulse of laser rays and the time of receipt of said output signal so as to measure the distance to each object point, of an image obtained while scanning and, thus, to obtain data relevant to a 3-D image; and
- a correcting arrangement within the path of rays of said beam scanning means for correcting the focal shift that results from said spherical cap window means.

18. Scanning apparatus for use in a scanning optical system comprising:
- a source of laser radiation;
- beam scanning means for directing incident rays of radiation from said laser source to produce a pattern of a scanning beam,
- first bearing means for rotatably supporting said beam scanning means about a first axis of rotation;
- second bearing means for rotatably supporting said beam scanning means about a second axis of rotation perpendicular to said first axis of rotation so as to define an intersecting point of said axes of rotation;
- window means in the shape of a spherical cap so as to define a central axis through the window means, said central axis intersecting said intersecting point; and
- a correcting arrangement within the path of rays of said beam scanning means for correcting the focal shift that results from said spherical cap window means.

19. Apparatus as claimed in claim 18, wherein said correcting arrangement comprises a positive lens in the path of rays from said radiation source to said beam scanning means.

20. Apparatus as claimed in claim 18, wherein said correcting arrangement comprises a concave curvature of said mirror means.

21. Apparatus as claimed in claim 18, wherein at least one of the transmitter and/or receiver optics is designed so as to correct the effect of the curved window, while supplying an uncorrected image in case the window were removed.

22. Scanning apparatus for use in a scanning optical system comprising:
- a source of laser radiation;
- beam scanning means for directing incident rays of radiation from said laser source to produce a pattern of a scanning beam,
- first bearing means for rotatably supporting said beam scanning means about a first axis of rotation;
- second bearing means for rotatably supporting said beam scanning means about a second axis of rotation perpendicular to said first axis of rotation so as to define an intersecting point of said axes of rotation;
- receiver means for receiving rays sent by said source of laser radiation and reflected from an object outside said window means, said receiver means being arranged so as to receive said reflected rays via the center range of said mirror means to provide an output signal;
- an optical arrangement assigned to and in the path of rays of said source of laser radiation and said receiver means, said optical arrangement including window means in the shape of a spherical cap so as to define a central axis through the window means, said central axis intersecting said intersecting point; and
- a correcting arrangement within the path of rays of said beam scanning means for correcting the focal shift that results from said spherical cap window means.

23. Apparatus as claimed in claim 22, wherein said correcting arrangement comprises a positive lens in the path of rays from said radiation source to said beam scanning means, so as to be commonly assigned to said source of laser and said receiver means.

24. Apparatus as claimed in claim 23, wherein said optical arrangement comprises first optical means before said source of laser radiation and second optical means before said receiver means.

25. Apparatus as claimed in claim 24, wherein said correcting arrangement comprises at least one optical element in at least one of said first and second optical means which is corrected so as to take the spherical curvature of said window means into account.

26. Scanning apparatus for use in a scanning optical system comprising:
- a source of laser radiation;
- beam scanning means for directing incident rays of radiation from said laser source to produce a pattern of a scanning beam,
- first bearing means for rotatably supporting said beam scanning means about a first axis of rotation;
- second bearing means for rotatably supporting said beam scanning means about a second axis of rotation perpendicular to said first axis of rotation so as to define an intersecting point of said axes of rotation;

window means of a transparent material in the shape of a spherical cap so as to define a central axis through the window means, said central axis intersecting said intersecting point;

first and second angle indicating means respectively assigned to said first and second bearing means for rotatably supporting the beam scanning means so as to indicate the respective angle of rotation of said beam scanning means; and a correcting arrangement within the path of rays of said beam scanning means for correcting the focal shift that results from said spherical cap window means.

27. Scanning apparatus for use in a scanning optical system comprising:

a source of laser radiation for sending laser rays along an axis;

tiltable mirror means for directing incident rays of radiation from said laser source to produce a pattern of a scanning beam, said mirror means defining a mirror plane;

first bearing means for rotatably supporting said mirror means about a first axis of rotation;

second bearing means for rotatably supporting said mirror means about a second axis of rotation perpendicular to said first axis of rotation so as to define an intersecting point of said axes of rotation;

one of said first and second axes of rotation being at least substantially situated in said mirror plane;

window means in the shape of a spherical cap so as to define a central axis through the window means, said central axis intersecting said intersecting point; and receiver means for receiving rays sent by said source of laser radiation and reflected from an object outside said window means; and a correcting arrangement within the oath of rays of said tiltable mirror means for correcting the focal shift that results from said spherical cap window means.

\* \* \* \* \*